United States Patent
Zhang et al.

(10) Patent No.: US 12,541,322 B2
(45) Date of Patent: Feb. 3, 2026

(54) MEMORY MANAGEMENT FOR OVERLAP DATA BETWEEN TILES OF NEURAL NETWORKS

(71) Applicant: NVIDIA Corporation, Santa Clara, CA (US)

(72) Inventors: Yilin Zhang, Shanghai (CN); Yan Zhou, Shanghai (CN); Qifei Fan, Shanghai (CN)

(73) Assignee: NVIDIA Corporation, Santa Clara, CA (US)

( * ) Notice: Subject to any disclaimer, the term of this patent is extended or adjusted under 35 U.S.C. 154(b) by 1161 days.

(21) Appl. No.: 17/446,257

(22) Filed: Aug. 27, 2021

(65) Prior Publication Data

US 2022/0413752 A1 Dec. 29, 2022

Related U.S. Application Data

(63) Continuation of application No. PCT/CN2021/102278, filed on Jun. 25, 2021.

(51) Int. Cl.
*G06F 12/0813* (2016.01)
*G06F 3/06* (2006.01)
(Continued)

(52) U.S. Cl.
CPC ............ *G06F 3/0656* (2013.01); *G06F 3/061* (2013.01); *G06F 3/0673* (2013.01);
(Continued)

(58) Field of Classification Search
None
See application file for complete search history.

(56) References Cited

U.S. PATENT DOCUMENTS

2016/0259734 A1\* 9/2016 Mukherjee ............ G06F 12/126
2019/0147332 A1\* 5/2019 Lagudu .................... G06N 3/08
706/25
(Continued)

FOREIGN PATENT DOCUMENTS

| CN | 111353575 A | 6/2020 |
| CN | 112395547 A | 2/2021 |
| GB | 202005436 | 5/2020 |

OTHER PUBLICATIONS

International Search Report and Written Opinion mailed on Mar. 23, 2023, on application No. PCT/CN2021/102278.
(Continued)

*Primary Examiner* — Kamran Afshar
*Assistant Examiner* — Steven Phung
(74) *Attorney, Agent, or Firm* — Lowenstein Sandler LLP

(57) ABSTRACT

Techniques for providing an overlap data buffer to store portions of tiles between passes of chained layers of a neural network are described. One accelerator circuit includes one or more processing units to execute instructions corresponding to the chained layers in multiple passes. In a first pass, the processing unit(s) receives a first input tile of an input feature map from a primary buffer and performs a first operation on the first input tile to obtain a first output tile. The processing unit stores the first output tile in the primary buffer and identifies a portion of the first output tile as corresponding to overlap data between tiles of the input feature map. The processing unit stores the portion in a secondary buffer. In a second pass, the processing unit retrieves the portion to avoid fetching the portion that overlaps and computing the overlap data again.

20 Claims, 9 Drawing Sheets

(51) Int. Cl.
*G06F 12/0811* (2016.01)
*G06F 12/0871* (2016.01)
*G06F 12/0873* (2016.01)
*G06F 12/0875* (2016.01)
*G06N 3/04* (2023.01)
*G06N 3/045* (2023.01)
*G06N 3/0464* (2023.01)
*G06N 3/048* (2023.01)
*G06N 3/063* (2023.01)
*G06N 3/08* (2023.01)

(52) U.S. Cl.
CPC ...... *G06F 12/0811* (2013.01); *G06F 12/0871* (2013.01); *G06F 12/0873* (2013.01); *G06N 3/04* (2013.01); *G06N 3/045* (2023.01); *G06N 3/048* (2023.01); *G06N 3/063* (2013.01); *G06N 3/08* (2013.01)

(56) References Cited

U.S. PATENT DOCUMENTS

| 2019/0220734 A1* | 7/2019 | Ferdman | G06F 17/15 |
| 2019/0220742 A1* | 7/2019 | Kuo | G06N 3/048 |

OTHER PUBLICATIONS

Office Action for Chinese Patent Application No. 202180007994.8, mailed Jun. 18, 2025, 52 Pages.

* cited by examiner

MEMORY MANAGEMENT FOR OVERLAP DATA BETWEEN TILES OF NEURAL NETWORKS

TECHNICAL FIELD

At least one embodiment pertains to processing resources used to perform and facilitate artificial intelligence. For example, at least one embodiment pertains to a secondary buffer for overlap data between tiles in chaining neural networks layers.

BACKGROUND

In many instances, the majority of computing effort for deep learning inference is based on mathematical operations that can generally be grouped into four parts: convolutions, activations, pooling, and normalization. These operations share a few characteristics that make them particularly well suited for hardware implementations: their memory access patterns are predictable and readily parallelized.

DETAILED DESCRIPTION

Figure 1:
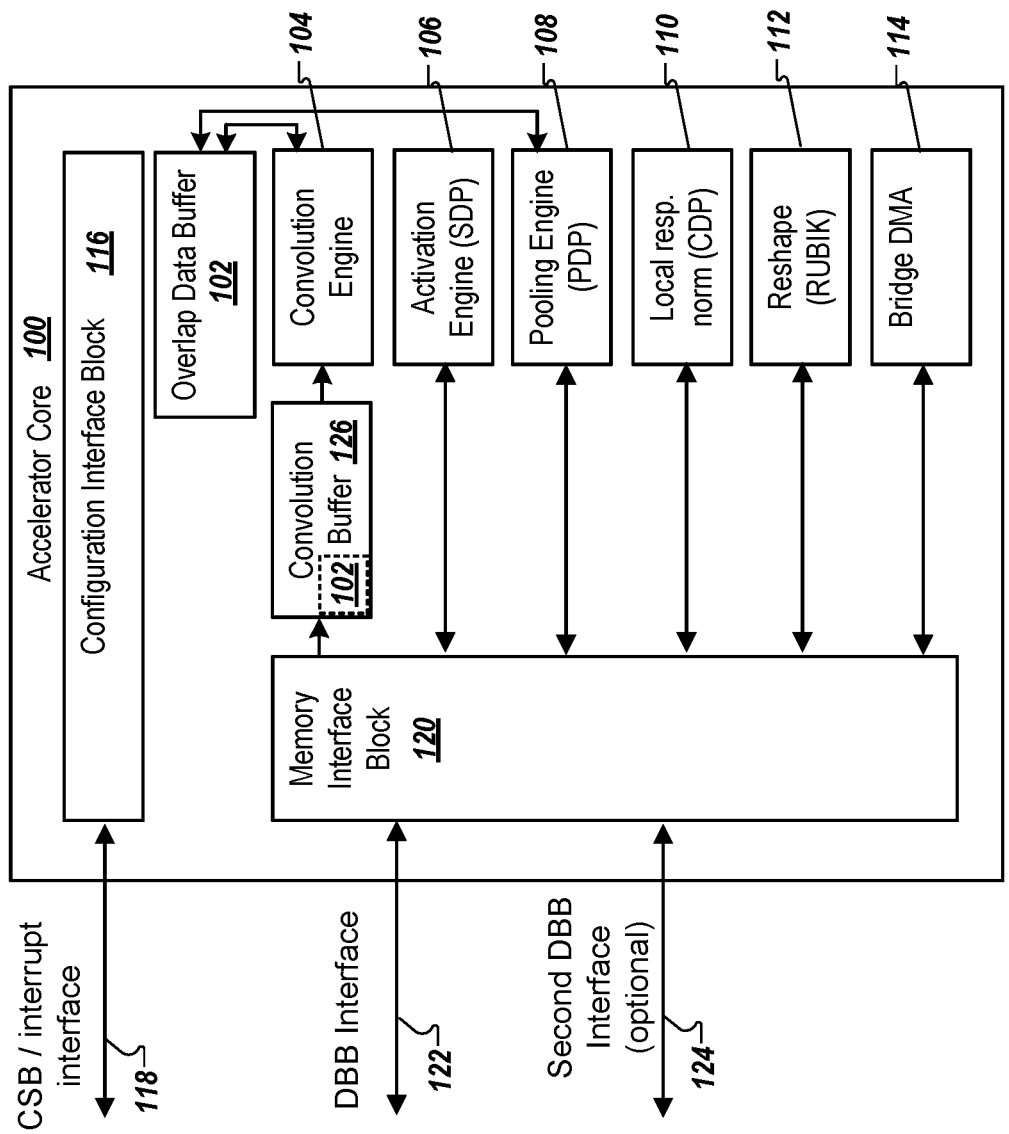
FIG. 1 is a block diagram of an accelerator core with an overlap data buffer for tiling between chained layers performed by fixed-function circuits, in accordance with at least some embodiments.

As described above, deep learning inference is based on operations that are well suited for hardware implementations. Deep Learning Accelerator (DLA) circuits, such as NVIDIA® Deep Learning Accelerator (NVDLA), can be used to address the computational demands of inference by providing building blocks that accelerate core deep learning operations. A deep learning accelerator can be used to accelerate different neural networks, such as convolutional neural networks (CNNs), recurrent neural networks (RNN), fully connected neural networks, and so on. These neural networks may have very different structures, may not follow any pre-defined network structure, and new neural networks are being introduced regularly.

Currently, DLA circuits use fixed-function engines (also referred to herein as fixed-function units or fixed-function circuits or compute units) for different types of layers in these neural networks, such as fixed-function engines for convolutions, activation functions, pooling, batch normalization, or the like. Each layer can be a basic hardware instruction for one of the fixed-function engines to perform an operation, and each layer communicates with another layer by a memory interface. For example, a first layer can be performed by a first-fixed function engine that receives an input tensor, performs an operation on the input tensor to generate an output tensor, and stores the output tensor in system memory, such as dynamic random access memory (DRAM) coupled to the accelerator. A second layer can be performed by a second fixed-function engine that receives the output tensor from the first layer from memory as a second input tensor, performs an operation on the second input tensor to generate a second output tensor, and stores the second output tensor in DRAM. Each communication introduces a tensor read operation and a tensor write operation in the memory interface.

Chaining is a mechanism to leverage an accelerator's internal memory, such as internal static random access memory (SRAM). In chaining, an intermediate tensor is written to the internal SRAM by a current layer, and a subsequent layer fetches data from the internal SRAM. Using the chaining approach, the memory interface traffic is reduced, which boosts performance and power efficiency. For the best case, all layers of a network can be chained, leaving external memory accesses for the first input of a first layer and the output of a last layer. A compiler can use a chaining algorithm to determine how layers can be chained to utilize the internal SRAM. Chaining algorithms take into consideration the following items: persistent weight or persistent feature options, when to terminate chaining, convolution buffer allocation, and feature crossing (e.g., chaining plus batch, chaining plus weight prefetch, or the like).

In order to avoid imbalances between a processing unit and memory bandwidth, data can be made resident in an internal SRAM of an accelerator. Tiling is a popular technology when input feature data is too large to fit in internal SRAM. For example, each of the layers can be divided into N tiles corresponding to N passes. A pass is defined as a set of hardware layers that communicate by SRAM, and if one chain is divided into N tiles, then that chain block contains N passes. For example, suppose a set of chained hardware layers (hardware layer instructions) is divided into N tiles. In that case, the set of chained hardware layers (hardware layer instructions) has N passes, and each of the hardware layers is executed N times in a chained fashion with the other hardware layers. It should be noted that a neural network, from an algorithmic perspective, can be specified with one set of layers (referred to herein as "original layers"), such as bias and batch normalization. Those original layers can be compiled or transformed into another set of layers (referred to herein as "hardware layers"), where each hardware layer is used as a basic element for scheduling to be executed on an accelerator circuit. The mapping between original layers and hardware layers can be men, where m is the number of original layers and n is the number of hardware layers. For example, original layers such as bias, batch normalization, and local response normalization (LRN), such as a rectified linear unit (ReLU), in a neural network can be compiled into one hardware layer. In that case, the men is 3:1. Each hardware layer can be represented by a basic hardware instruction for one of the fixed-function engines to perform an operation, and each layer communicates with another layer by a memory interface. For example, a first layer can be performed by a first fixed-function engine that receives an input tensor, performs an operation on the input tensor to generate an output tensor, and stores the output tensor in system memory, such as dynamic random access memory (DRAM) coupled to the accelerator. A second layer can be performed by a second fixed-function engine that receives the output tensor from the first layer from memory as a second input tensor, performs an operation on the second input tensor to generate a second output tensor, and stores the second output tensor in DRAM. Each communication introduces a tensor read operation and a tensor write operation in the memory interface.

Convolution and pooling are common operators in neural networks. A set of input pixels in a window is involved for these operators to obtain one output pixel. If tiling is used, there is overlap data between each tile. The overlap data is referred to as halo. For a single-layer operation, the halo is fetched for each tile, thus consuming additional bandwidth. When multiple layers are chained together, as described above, the traditional approach re-computes the halo for each tile, thus wasting computational resources. Traditional approaches generally either over-fetch halo to deal with a single layer halo or over-compute to deal with the multi-layer halo.

Aspects and embodiments of the present disclosure address these and other challenges by providing, for example, an overlap data buffer to store portions of tiles between passes of chained layers of a neural network. One accelerator circuit includes at least one processing unit to execute instructions corresponding to the chained layers in multiple passes. In a first pass, at least one processing unit receives a first input tile of an input feature map from a primary buffer and performs a first operation on the first input tile to obtain a first output tile. The processing unit stores the first output tile in the primary buffer and identifies a portion of the first output tile as corresponding to overlap data between tiles of the input feature map. The processing unit stores the portion in a secondary buffer. In a second pass, the processing unit retrieves the portion to avoid fetching the overlapping portion and computing the overlap data (halo) again. Using the embodiments described herein, when multiple layers are chained together, the halo is stored in a secondary buffer between passes, reducing the consumption of additional bandwidth to re-fetch halo and reduces the consumption of computational resources to re-calculate halo. The required buffering size between passes is pre-deterministic and can be determined during offline compilation. For example, a compiler can reserve a small SRAM region (also referred to herein as secondary buffer, user-defined buffer (UBUF), and overlap data buffer). The compiler can create instructions in one pass to output halo to the reserved SRAM and instructions in a subsequent pass to fetch halo from the reserved SRAM to tensor data SRAM. In at least one embodiment, the stride is carefully programmed to avoid contaminating valid tensor data. Aspects and embodiments of the present disclosure can improve computation utilization while reducing system bandwidth consumption. For example, a large percentage of deep learning workloads are convolution and pooling operations. Using aspects and embodiments of the present disclosure in convolution and pooling layers improves the computation utilization while reducing the system bandwidth consumption. Aspects and embodiments of the present disclosure can be used in accelerator circuits, graphics processing units (GPUs), or the like.

FIG. 1 is a block diagram of an accelerator core 100 with an overlap data buffer 102 for tiling between chained layers performed by fixed-function circuits 104-114 (also referred to herein as fixed-function engines), in accordance with at least some embodiments. The accelerator core 100 (also referred to herein as DLA core or accelerator circuit) includes the overlap data buffer 102 and various fixed-function circuits, such as a convolution engine 104 (also referred to herein as convolution core), an activation engine 106 (also referred to herein as a single data processor (SDP)) that is a single-point lookup engine for activation functions, a pooling engine 108 (also referred to herein as a planar data processor (PDP)) that is a planar averaging engine for pooling, a local response normalization (LRN) engine 110 (also referred to herein as cross-channel data processor (CDP)) that is a specialized unit that applies the LRN function that operates on channel dimensions, as opposed to the spatial dimensions, a data reshape engine 112 (also referred to herein as RUBIK) that performs data format transformation (e.g., splitting or slicing, merging, contraction, reshape-transport), and a bridge direct memory access (DMA) engine 114 that can move data between the system DRAM and the dedicated memory interface. Additional details of the overlap data buffer 102 are described below. In other embodiments, the accelerator core 100 can include more or fewer engines than set forth in FIG. 1. Each of these engines can be separate and independently configurable. For example, a system that does not need pooling operations can remove the planar averaging engine entirely. For another example, a system that needs additional convolution performance can scale up the convolution engine's performance without modifying other units in the accelerator core 100.

As illustrated in FIG. 1, the accelerator core 100 has multiple connections to the rest of a DLA system, including a configuration interface block 116 that includes a configuration space bus (CSB) interface and an interrupt interface. The configuration interface block 116 can be a control channel interface that implements a register file (e.g., configuration registers) and an interrupt interface (labeled as CSB/interrupt interface 118). In at least one embodiment, the CSB interface is a synchronous, low-bandwidth, low-power, 32-bit control bus designed to be used by a central processing unit (CPU) (not illustrated in FIG. 1) to access configuration registers in the configuration interface block 116. The interrupt interface can be a 1-bit level-driven interrupt. The interrupt line can be asserted when a task has been completed or when an error occurs. The accelerator core 100 can also include a memory interface block 120 that uses one or more bus interfaces to interface with memory. In at least one embodiment, the memory interface block 120 has a primary memory interface 122 connecting to system memory (not illustrated in FIG. 1). The system memory can include DRAM. The primary memory interface 122 can be shared with the CPU and input/output (I/O) peripherals. In at least one embodiment, the primary memory interface 122 is a data backbone (DBB) interface that connects the accelerator core 100 and other memory subsystems. The DBB interface is a configurable data bus that can specify different address sizes, different data sizes, and issue different sizes of requests. In at least one embodiment, the DBB interface uses an interface protocol, such as AXI (Advanced Extensible Interface) or other similar protocols. In at least one embodiment, the memory interface block 120 has a second memory interface 124 that allows for a connection to higher-bandwidth memory dedicated to the accelerator core 100 or a computer vision subsystem. For example, the second memory interface 124 can be used with an on-chip SRAM to provide higher throughput and lower access latency.

The memory interface block 120 is coupled to each of the fixed-function circuits 104-114. A convolution buffer 126 can be used between the memory interface block 120 and the convolution engine 104 to avoid repeated accesses to system memory. The convolution buffer 126 can be an internal RAM reserved for weight and input feature/pixel storage. In at least one embodiment, the overlap data buffer 102 can be a reserved region of the convolution buffer 126. The overlap data buffer 102 can be an internal SRAM reserved for overlap data storage between passes when tiling is used.

During operation of the accelerator core 100, the processing flow begins with a management processor (either a microcontroller or a CPU), coupled to the accelerator core 100, sending a hardware layer configuration and an activate command. If data dependencies do not preclude this, multiple hardware layers can be sent to different engines and activated simultaneously (i.e., if there is another layer whose inputs do not depend on the previous layer's output). In at least one embodiment, every engine can have a double buffer for its configuration registers that allows a second layer's configuration to begin processing when the active layer has completed. Once a hardware engine finishes its active task, the configuration interface block 116 can interrupt the management processor to report the completion, and the management processor can begin the process again. This kind of command-execute-interrupt flow repeats until inference on the entire network is complete.

Referring back to FIG. 1, each of the fixed-function circuits 104-114 processes one compiled hardware layer of a neural network at a time, and the fixed-function circuits process different layer types of the neural network. In at least one embodiment, the first fixed-function circuit is any one of the convolution engine 104, the activation engine 106, the pooling engine 108, the LRN engine 110, the data reshape engine 112, or the bridge DMA engine 114. Alternatively, the first fixed-function circuit can be other computational units of the accelerator core 100 or computational units external to the accelerator core 100.

There is a technique to load tensors to the local cache, convolution buffer 126, known as a tiled technique. A tiled technique divides a tensor into one or more tiles of a pre-specified dimension that can fit into the convolution buffer 126. Each tile can be loaded, one at a time, from global memory into the convolution buffer 126 for the convolution engine 104 to perform a convolution to the tile. Although not illustrated in FIG. 1, the other fixed-function circuits 106-114 can also access shared/cache memory. Each tile can be loaded, one at a time, from global memory into the shared/cache memory for a processing unit to perform a computation to the tile. The tiled technique may not require data replication when used with general matrix multiply (GEMM)-based algorithms.

A processing unit can access a tensor to perform some operations on the tensor. One such operation is a convolution operation in deep learning applications. However, embodiments are not limited to convolution operations. A convolution operation is used in a layer of a convolutional neural network (CNN) to analyze images for machine learning applications, such as image classification, object detection, image segmentation, etc. A convolution operation can be performed for a convolutional layer of a CNN during inference and/or training. For example, a convolutional layer can apply a convolution function of a weight filter to a window of elements (a receptive field location) in an input tensor, where a receptive field corresponds to a location of an input tensor to detect a presence of features at a location. Strides of applications of a filter to different locations in an input tensor generate a map of activations (or a feature map), where a feature map indicates the strength of a detected feature in an input tensor.

In at least one embodiment, an arithmetic framework for a convolutional operation can be:

$$O_{n,m,h,w} = \Sigma_{i=0}^{C-1} \Sigma_{j=0}^{R-1} \Sigma_{k=0}^{S-1} \text{val} \times F_{m,i,j,k},$$

where, $$val = \begin{cases} I_{n,i,u,v}, & \text{if } u = h + j - \left\lfloor \frac{R}{2} \right\rfloor \geq 0 \wedge v = w + k - \left\lfloor \frac{S}{2} \right\rfloor \geq 0 \\ 0, & \text{otherwise.} \end{cases}$$

Such that, $0 \leq n < N \wedge 0 \leq m < M \wedge 0 \leq h < H \wedge 0 \leq w < W$.

The convolution buffer 126 can be a primary buffer, and the overlap data buffer 102 can be a secondary buffer. For example, if there are two layers and an input tensor is too big to store in the primary buffer (e.g., internal SRAM), a layer is divided into three hardware instructions. There are two options for persistent data between layers, such as illustrated in FIGS. 2A-2B, and the overlap data buffer 102 is described below with respect to FIGS. 3-5.

Figure 2A:
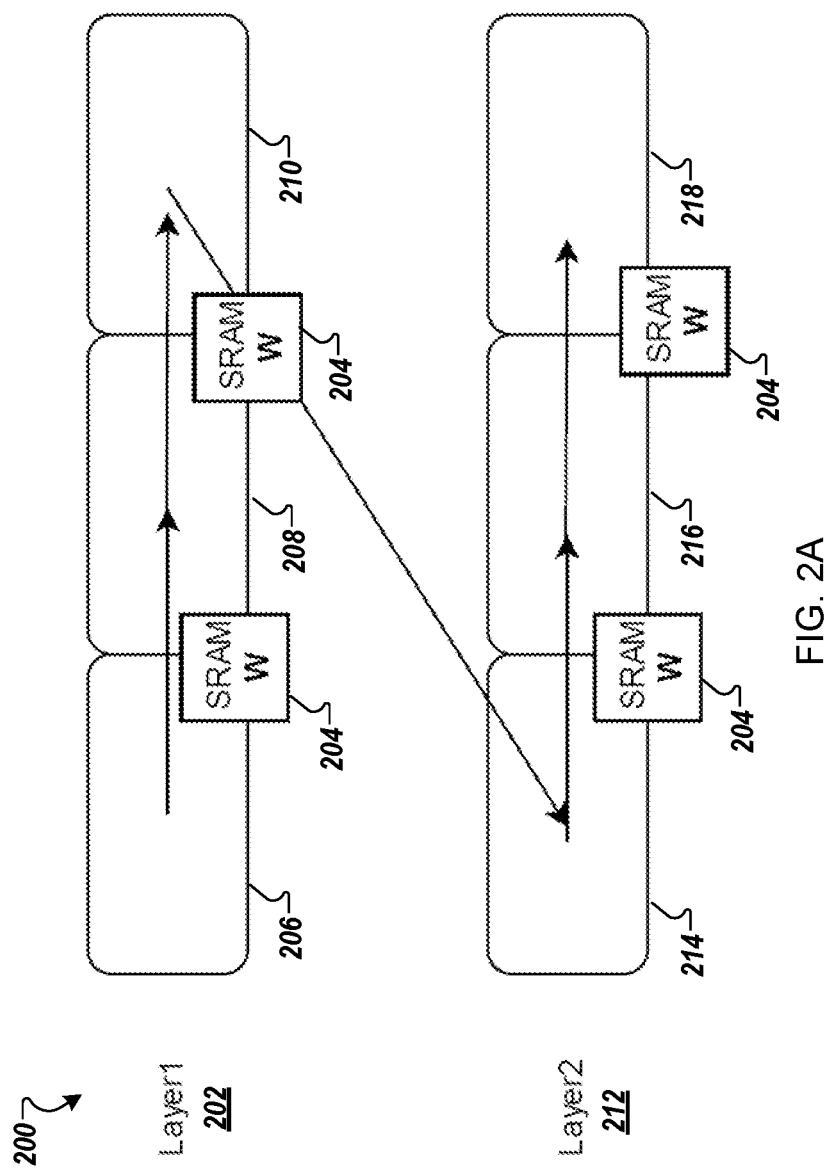
FIG. 2A is a diagram illustrating a persistent weight option, according to at least one implementation.

FIG. 2A is a diagram illustrating a persistent weight option 200, according to at least one implementation. For the persistent weight option 200 in the primary buffer (e.g., internal SRAM), a first instruction 206 of a first layer 202 fetches weights from an external memory (e.g., DRAM), performs a first operation using the weights, and stores the weights in the internal SRAM 204 (primary buffer). The weights persist in the internal SRAM 204, and a second instruction 208 of the first layer 202 fetches the weights from the internal SRAM 204, instead of the external memory. Similarly, a third instruction 210 of the first layer 202 fetches the weights from the internal SRAM 204, instead of the external memory. A second layer 212 is chained with the first layer 202. Weights for the second layer 212 are fetched from the external memory (e.g., DRAM) and then stored in the internal SRAM 204, and first, second, and third instructions 214, 216, 218 of the second layer 212 fetch the weights from the internal SRAM 204, instead of the external memory. In this implementation, there are two weight read accesses from the external DRAM, two feature read accesses from the external DRAM, and two feature write accesses to the external DRAM.

Figure 2B:
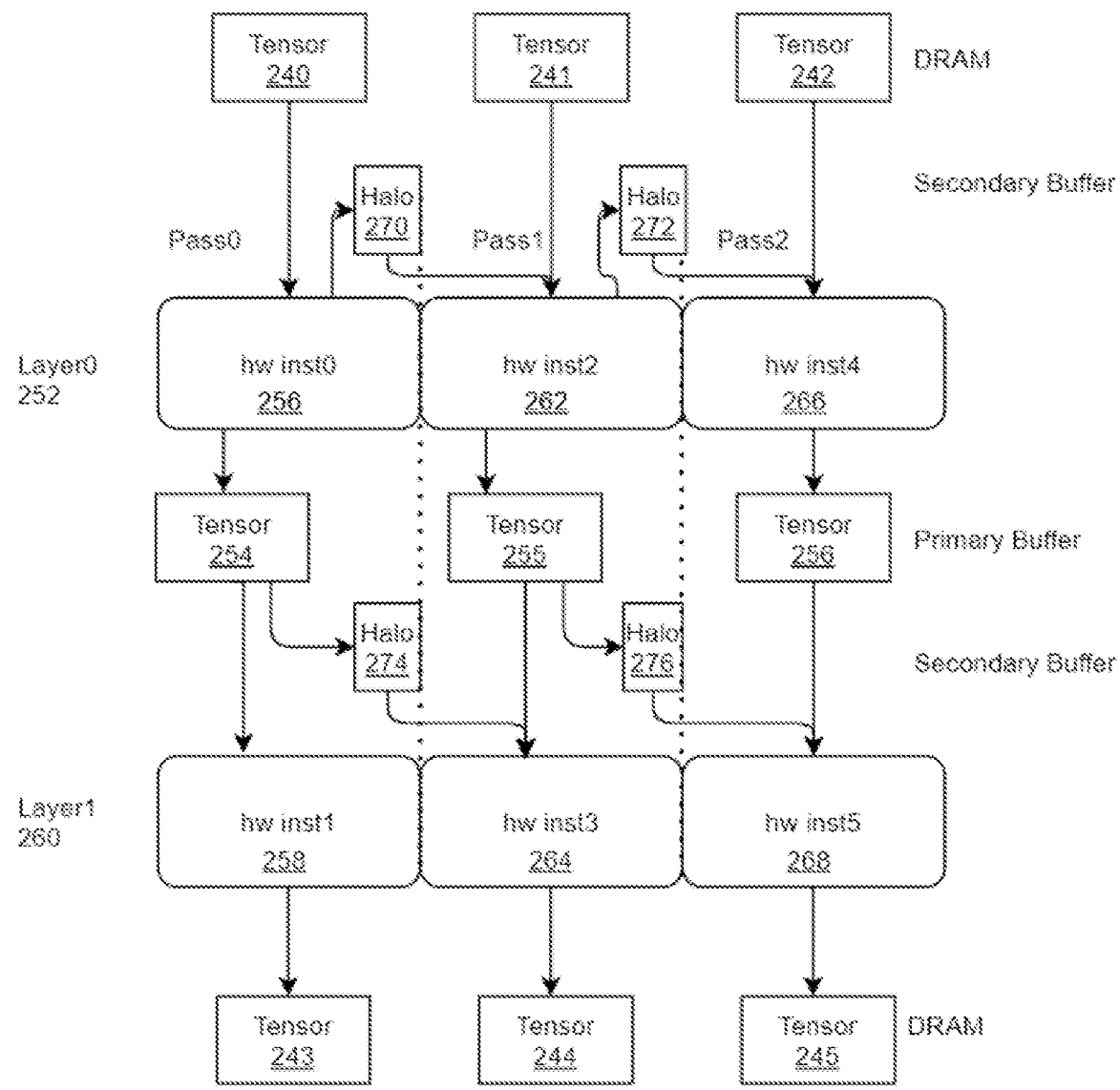
FIG. 2B is a diagram illustrating a persistent feature option, according to at least one implementation.

FIG. 2B is a diagram illustrating a persistent feature option 250, according to at least one implementation. For the persistent feature option 250 in the primary buffer (e.g., internal SRAM), a first instruction 256 (hw inst0) of a first layer 252 fetches the first feature data 240 from an external memory (e.g., DRAM), and performs a first operation using the first feature data to obtain second feature data 254. The first instruction 256 stores the second feature data 254 in a primary buffer (e.g., the internal SRAM). Due to the halo attribute of convolution/pooling operation, the compiler determines the overlaps that could be used in the second pass, including input feature map 270 (halo) and input feature map 274 (halo). In at least one embodiment, the compiler generates DMA instruction to crop the halo (input feature maps 270, 274). The input feature map 270 will be used by the second instructions 262 (hw inst2) of a second pass to produce feature data 255. Similarly, input feature map 274 will be used by the second instruction 264 of the second pass (hw inst3) to produce output feature data 244. Thus, the compiler stores input feature map 270 (halo) and input feature map 274 (halo) to a secondary buffer. The secondary buffer can be a reserved region of SRAM. It should be noted that the secondary buffer can be a logical construct or a physical construct. From a physical implementation perspective, it can choose either a unified SRAM (i.e., the same SRAM as the primary buffer) or another level of SRAM. A first instruction 258 (hw inst1) of a second layer 260, which is chained with the first layer 252, fetches the second feature data 254 from the primary buffer, instead of the external memory, and performs a second operation using the second feature data 254 to obtain third feature data 243. The first instruction 258 stores the third feature data 243 in the external memory (e.g., DRAM). The third feature data 243 is a portion of the final result of the chained layers.

A second instruction 262 (hw inst2) of the first layer 252 fetches third feature data 241 from the external memory (e.g., DRAM), and performs the first operation using the third feature data 241 to obtain fourth feature data 255. Similarly as the first instruction 256, the compiler generates DMA instruction to crop the halo (e.g., 274, 276) and stores the halo to secondary buffer for future use. The second instruction 262 stores the fourth feature data 255 in the primary buffer (e.g., internal SRAM). A second instruction 264 (hw inst3) of the second layer 260 fetches the fourth feature data 255 from the primary buffer and the input feature map 274 (halo) from the secondary buffer, and performs the second operation using the fourth feature data 255 and the input feature map 274 to obtain fifth feature data 244. Given the fifth feature data 244 is the final output of the chained layers, the second instruction 265 stores the fifth feature data 244 in the external memory (e.g., DRAM). It should be noted that it is not necessary to allocate individual SRAM for the input feature maps 270, 272, 274, 276. In at least one embodiment, the input feature maps 270, 272, 274, 276 can use the same memory region. For example, in the lifetime of the input feature maps 270 and 270, there may not be an overlap, so the same memory region can be used for both in a time-multiplexed manner.

A third instruction 266 (hw inst4) of the first layer 252 fetches fifth feature data 242 from the external memory (e.g., DRAM), and performs the first operation using the fifth feature data 242 to obtain sixth feature data 256. The third instruction 266 stores the sixth feature data 256 in the primary buffer (e.g., internal SRAM). Unlike the first instruction 256 and second instruction 262, the third instruction 266 is the last pass and does not need to store halo data. A third instruction 268 (hw inst5) of the second layer 260 fetches the sixth feature data 256 from the primary buffer and the input feature map 276 (halo) from the secondary buffer, and performs the second operation using the sixth feature data 256 and the input feature map 276 to obtain seventh feature data 245. The third instruction 268 stores the seventh feature data 245 in the external memory (e.g., DRAM). After the third instructions 266, 268, the entire output tensor is computed.

Referring back to FIG. 1, in at least one embodiment, the accelerator core 100 is a deep learning accelerator (DLA) core that includes a register file to store configuration information associated with at least a portion of a neural network having multiple layers. The DLA core includes a memory interface (e.g., memory interface block 120) that couples to an external memory device (not illustrated in FIG. 1), a convolution buffer 126, and a convolution engine 104. The convolution buffer 126 includes a reserved region for the overlap data buffer 102 (as illustrated in the hashed block within 126), or the overlap data buffer 102 that is separate from the convolution buffer 126 as illustrated in FIG. 1 and described herein. The convolution engine 104, in a first pass, receives a first input tile of an input feature map from the convolution buffer 126. The size of the input feature map may exceed a storage capacity of the convolution buffer 126. In at least one embodiment, the input feature map includes at least the first input tile and a second input tile. The convolution engine 104 executes a first hardware layer on the first input tile to obtain a first output tile and stores the first output tile in the convolution buffer 126. The convolution engine 104 identifies a portion of the first output tile as corresponding to overlap data between the first input tile and the second input tile and stores the portion of the first output tile in the reserved region (overlap data buffer 102).

In at least one embodiment, the convolution engine 104, in a second pass subsequent to the first pass, receives a portion of the second input tile from the convolution buffer 126. This portion can represent a portion of the second input tile that does not overlap with the first input tile since that data has already been fetched and computed. The convolution engine 104 executes the first hardware layer on the portion of the second input tile to obtain a portion of a second output tile and retrieves the portion of the first output tile from the reserved region. The convolution engine 104 stores the second output tile, including the portion of the second output tile and the portion of the first output tile, in the convolution buffer 126.

In at least one embodiment, the convolution engine 104, in the first pass, retrieves the first output tile from the convolution buffer 126 and executes a second hardware layer on the first output tile to obtain a third output tile. The convolution engine 104 stores the third output tile in the convolution buffer 126. In this embodiment, the convolution engine 104 does not store overlap data in the reserved region. In other embodiments, the convolution engine 104 can identify additional overlap data and store it in the reserved region. The convolution engine 104, in the second pass, retrieves the second output tile from the convolution buffer 126 and executes the second hardware layer on the second output tile to obtain a fourth output tile. The convolution engine 104 stores the fourth output tile in the convolution buffer. In at least one embodiment, the convolution engine 104, in the second pass, identifies a portion of the second output tile as corresponding to overlap data between the first input tile and a third input tile and stores the portion of the second output tile in the reserved region. In this embodiment, the input feature map includes the first input tile, the second input tile, and a third input tile. The convolution engine 104, in a third pass, receives a portion of the third input tile from the convolution buffer 126 and executes the first hardware layer on the portion of the third input tile to obtain a portion of a third output tile. The convolution engine 104 retrieves the portion of the second output tile from the reserved region and stores the portion of the second output tile as part of the third output tile in the convolution buffer 126. The third output tile includes the portion of the third output tile based on executing the first hardware layer and the portion of the second output tile retrieved from the reserved region.

Figure 3:
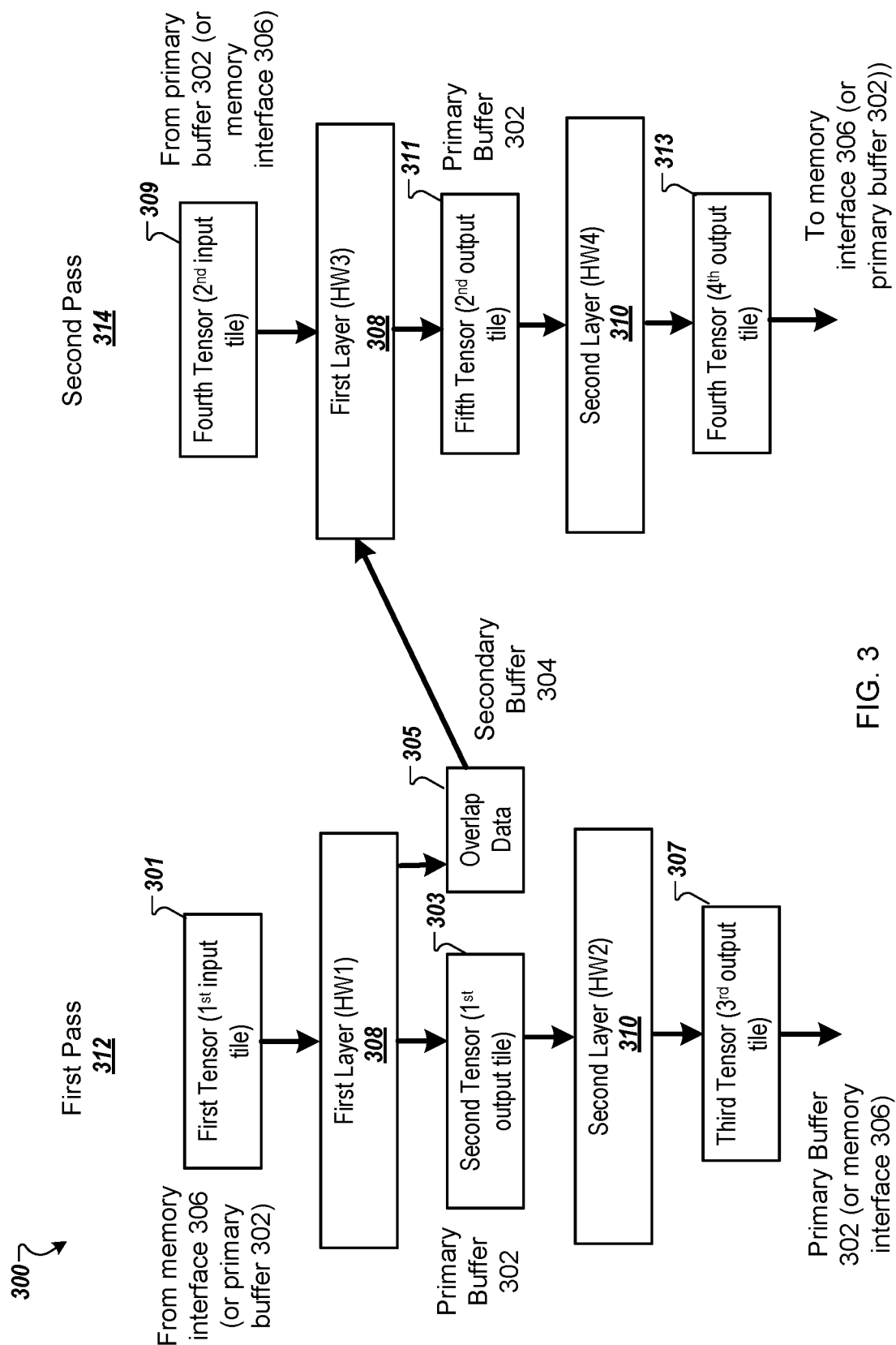
FIG. 3 is a diagram illustrating an accelerator circuit with two chained hardware layers using a secondary buffer between two passes for overlap data, in accordance with at least some embodiments.

FIG. 3 is a diagram illustrating an accelerator circuit 300 with two chained hardware layers using a secondary buffer between two passes for overlap data, in accordance with at least some embodiments. The accelerator circuit 300 includes a primary buffer 302 (e.g., internal SRAM), a secondary buffer 304, a memory interface 306, and one or more processing units that execute multiple chained layers.

The primary buffer 302 can be the internal SRAM of the accelerator circuit. The secondary buffer 304 can be another internal SRAM of the accelerator circuit or a reserved region of the internal SRAM used for the primary buffer 302. The secondary buffer 304 corresponds to the overlap data buffer 102 of FIG. 1. The memory interface 306 is coupled to an external memory device (external DRAM) coupled to the accelerator circuit 300. The accelerator circuit 300 uses one or more processing units and tiling to execute multiple chained hardware layers of a neural network in multiple passes. The number of passes is equal to the number of tiles used by the chained hardware layers. The accelerator circuit 300 includes a first layer 308 and a second layer 310. The first layer 308 and the second layer 310 are divided into two tiles. So, the first layer 308 executes a first hardware instruction (HW1) on two tiles and the second layer 310 executes a second hardware instruction (HW2) on the two tiles. In particular, the first layer 308 (Layer0) executes on a first tile (tile0), then a second layer 310 (Layer1) executes on the first tile (tile0), then the first layer 308 (Layer0) executes on a second tile (tile1), then the second layer (Layer1) executes on the second tile (tile1). In the illustrated embodiment, the accelerator circuit 300 includes two chained layers and two passes for simplicity of description but can include more than two chained layers and more than two passes in other embodiments.

In a first pass 312, a first layer 308 receives a first tensor 301. The first tensor 301 includes a first input tile of an input feature map from the memory interface 306. In some embodiments, the input feature map is too large to store in the primary buffer 302. For example, a size of the input feature map exceeds a storage capacity of the primary buffer 302 so the input feature map is divided into two tiles in the illustrated embodiment, including the first input tile and a second input tile. The first layer 308 performs a first operation, corresponding to a first hardware layer instruction, on the first tensor 301 (first input tile) to obtain a second tensor 303. The second tensor 303 includes a first output tile. The first output tile is also an input tile for the second layer 310. The first layer 308 stores the second tensor 303 in the primary buffer. The first layer 308 also identifies a portion of the first output tile as corresponding to overlap data 305 between the first input tile and the second input tile. The first layer 308 stores the overlap data 305 in the secondary buffer 304.

In at least one embodiment, in the first pass 312, the second layer 310 retrieves the second tensor 303, including the first output tile, from the primary buffer 302, instead of fetching the data from the external memory. The second layer 310 performs a second operation, corresponding to a second hardware layer instruction, on the first output tile to obtain a third tensor 307, including a third output tile. The second layer 310 stores the third tensor 307 into the primary buffer 302 or external memory (e.g., DRAM).

In a second pass 314, the first layer 308 receives a fourth tensor 309. The fourth tensor 309 includes a portion of the second input tile from the memory interface 306 (or from the primary buffer 302). The first layer 308 performs the first operation, corresponding to a third hardware layer instruction, on the portion of the second input tile to obtain a fifth tensor 311, including a portion of a second output tile. The first layer 308 also receives the portion of the first output tile from the secondary buffer 304 for the fifth tensor 311, the portion corresponding to the overlap data 305 between the first input tile and the second input tile. The second output tile includes the portion of the second output tile and the portion of the first output tile (e.g., overlap data 305). The first layer 308 stores the fifth tensor 311, including second output tile, in the primary buffer 302. Using the secondary buffer 304, the overlap data is not over-fetched and is not over-computed as described herein.

In at least one embodiment, in the second pass 314, the second layer 310 retrieves the fifth tensor 311, including the second output tile, from the primary buffer 302, instead of fetching the data from the external memory. The second layer 310 performs a second operation, corresponding to a fourth hardware layer instruction, on the second output tile to obtain a fourth tensor 313, including a fourth output tile. The second layer 310 stores the fourth tensor 313 into the primary buffer 302 or in the external memory (e.g., DRAM).

In at least one embodiment, the first input tile and the second input tile are fetched from the external memory and stored in the primary buffer before the first pass 312. In this embodiment, the first layer 308 in the second pass fetches the portion of the second input tile from the primary buffer 302 and the overlap data 305 from the secondary buffer 304.

In one embodiment, the first layer 308 is executed by a fixed-function engine, such as the convolution engine 104, and the same fixed-function engine executes the second layer 310. In another embodiment, the first layer 308 is executed by a first fixed-function engine, such as the convolution engine 104. The second layer 310 is executed by a second fixed-function engine different from the first fixed-function engine, such as the pooling engine 108. Alternatively, the first layer 308 and the second layer 310 can be performed by other fixed-function engines.

It should also be noted that in cases where there are more passes than two, the first layer 308 in the second pass 314 would identify a portion of the second output tile as corresponding to overlap data between the first input tile and a third input tile and store the portion of the second output tile in the secondary buffer 304. For example, if the input feature map includes the first input tile, the second input tile, and the third input tile, then a third pass can be used in which the first layer 308 receives a portion of the third input tile from the primary buffer 302, and performs the first operation on the portion of the third input tile to obtain a portion of a third output tile. The first layer 308 also retrieves the portion of the second output tile from the secondary buffer 304 and stores the second output tile as part of the third output tile in the primary buffer 302. The third output tile includes the portion of the third output tile based on the first operation and the portion of the second output tile retrieved from the secondary buffer 304.

In one embodiment, the primary buffer 302 and the secondary buffer 304 can be implemented in the same internal memory device. In at least one embodiment, the primary buffer is a first region of the internal memory device reserved as a first-level (L1) memory. The secondary buffer is a second region of the internal memory device reserved as a second-level (L2) memory. In this embodiment, the external memory device is reserved as a third-level (L3) memory. In another embodiment, the primary buffer 302 is implemented in a first internal memory device, and the secondary buffer 304 is implemented in a second internal memory device.

In one example, assuming there is an image convolution layer with the following parameters: i) input: W×H×C=960× 480×3; ii) kernel: 7×7×3×48, stride: 2×2, pad: 3×2, and iii) output: W×H×C=480×240×48. The input size parameter can be beyond the capacity of the primary buffer 302. Thus, the image convolution layer can be divided into three compiled hardware layers to be executed by the accelerator circuit 300. Each hardware layer produces an output tile of 160×

240×48, according to the convolution dimension formula: input=stride*(output−1)+kernel−pad_left−pad_right, the compiler can define the following parameters for the three hardware layers.

HWL1:
  Input: W×H×C=322×480×3
  Output: W×H×C=160×240×48
HWL2:
  Input: W×H×C=325×480×3
  Output: W×H×C=160×240×48
HWL3:
  Input: W×H×C=323×480×3
  Output: W×H×C=160×240×48

Summing the input widths together, there are 970 lines, resulting in 10 lines overlapping the three hardware layers.

In at least one embodiment, the overlap can be modeled. For example, if the width of the first tile is N, the last pixel of the first tile is N−1, and the first pixel of the second tile is N. The last pixel of the first tile has a corresponding input coordinate that is calculated as (N−1)*stride−pad_left+(kernel−1). The second tile's first pixel has a corresponding input coordinate that is calculated as N*stride−pad_left. The overlap can also be expressed as a kernel−stride. For the example above, the total overlap is a first overlap in the first tile and a second overlap in the second time, as expressed as Total_overlap=overlap1+overlap 2=(7−2)+(7−2)=10 lines, which is the same as determined above. In at least one embodiment, a compiler determines an overlap between each of the hardware layers and creates instructions to account for correctly fetching the tensor data and the overlap data from the primary and secondary buffers, respectively.

Some factors may affect chaining termination, including computational overhead and bandwidth overhead. A convolution operation is a regional-based operation (when kernel_size>1); thus if one layer is divided into multiple hardware instructions, there can be an overlap between each instruction on input. If there is no chaining, the entire tensor is ready in external memory (DRAM), and some additional over-fetch is needed. However, if chaining is used, the entire intermediate tensor between each instruction is not available; hence the overlapped region should be computed by the previous instruction, introducing over-computing. This overhead keeps increasing along with the depth of chained layers; thus, the more layers chained results in more compute overhead. On the other hand, the more layers chained, the less chance of DRAM traffic; thus, it is a balance between computational overhead and DRAM bandwidth benefit. The tradeoff may depend on layer parameters and bounding factors.

Referring back to FIG. 3, the feature data is stored in the primary buffer. In at least one embodiment, for each pass, the same weights can be shared. If the weights are stored in the primary buffer, then weight traffic on the memory interface can be reduced. However, the more layers being chained, the more primary buffer storage is needed to store the corresponding weight data. The capacity of the primary buffer for storing eights is another factor that can be considered during chaining depth evaluation. From a performance perspective, for layers not bounded by weight fetching, it is not mandatory to store them in the primary buffer. However, from a power perspective, reducing the memory traffic on the memory interface is beneficial. Again, it is a tradeoff between weight fetching power consumption and activation fetching power consumption. In at least one embodiment, the first layer 308 can use a first number of banks (e.g., 10 CBUF banks) for storing weight data in the primary buffer 302 and a second number of banks (e.g., 2 CBUF banks) for storing feature data in the primary buffer 302. The second layer 310 can use a first number of banks (e.g., 2 CBUF banks) for storing weight data in the primary buffer 302 and a second number of banks (e.g., 10 CBUF banks) for storing feature data in the primary buffer 302.

In at least one embodiment, the accelerator circuit 300 can use a feature crossing in which chaining is used in connection with batches or in connection with weight prefetches. A batch can have a couple of benefits, including the weights shared among different frames to save memory traffic on weight data, and efficiency can be boosted for some cases. For one case, if the primary buffer 302 is large enough to store all batches, a batch can be taken inside a chain while a different batch is still scheduled by software; otherwise, workloads in chain boundaries should be scheduled.

Figure 4:
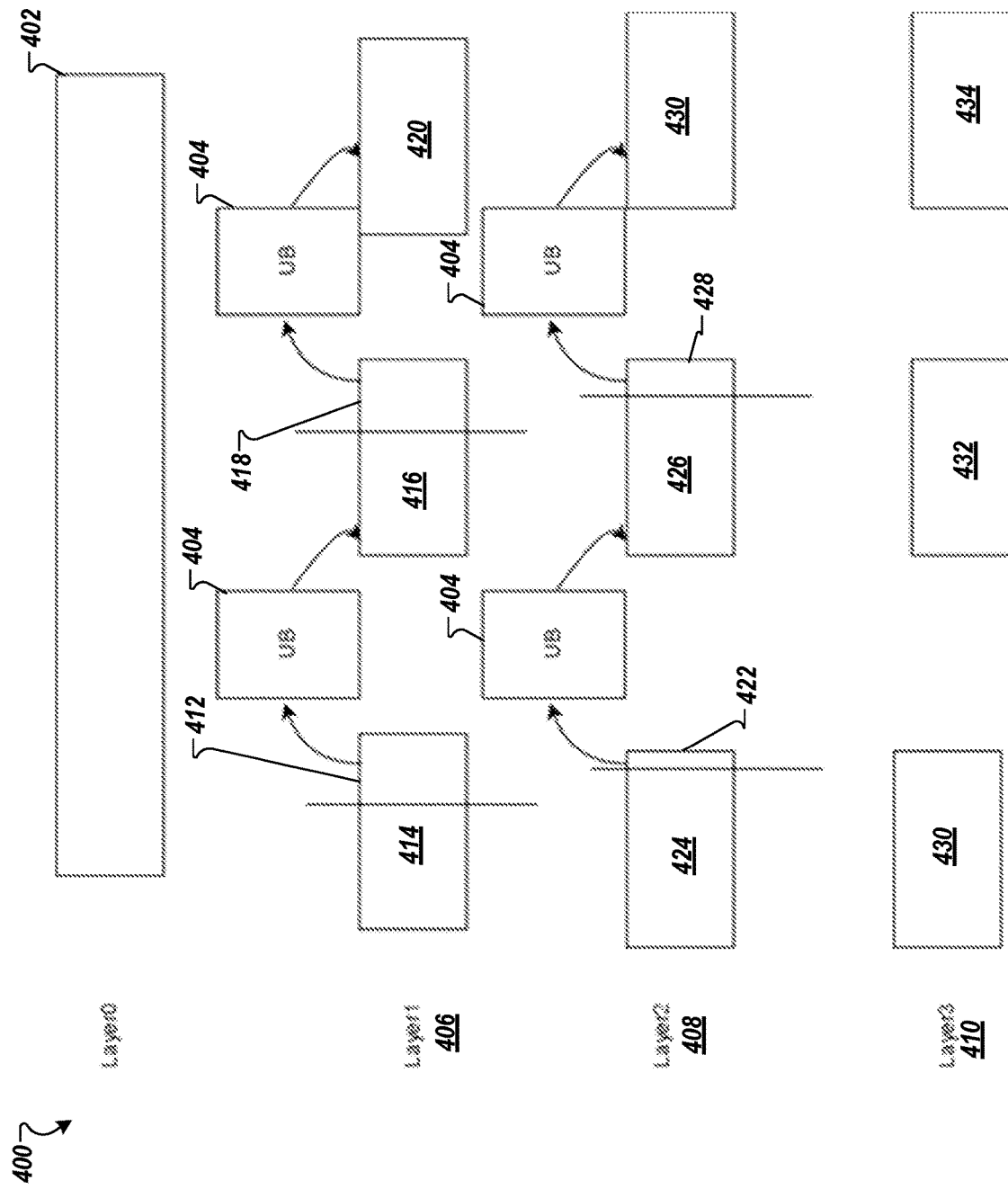
FIG. 4 is a diagram illustrating an accelerator circuit with four chained hardware layers using an overlap data buffer between three passes, in accordance with at least some embodiments.

FIG. 4 is a diagram illustrating an accelerator circuit 400 with four chained hardware layers using an overlap data buffer between three passes, in accordance with at least some embodiments. The accelerator circuit 400 includes an internal SRAM with a region reserved as a secondary buffer 404 (referred to as UB or UBUF). The rest of the internal SRAM can be reserved as the primary buffer (not illustrated in FIG. 4) (referred to as CBUF). The accelerator circuit 400 also includes a memory interface and one or more processing units that execute four chained layers, including an input layer 402 (layer0), a first layer 406, a second layer 408, and a third layer 410. Here, input data is separated into three tiles, and there are three passes. So, the first layer 406 executes a first hardware instruction three times for the three tiles, the second layer 408 executes a second hardware instruction three times for the three tiles, and the third layer 410 executes a third hardware instruction three times for the three tiles.

In a first pass, the first layer 406 executes a first instruction that identifies a first portion 412 of a first tile 414 to be stored in the secondary buffer 404. The first portion 412 represents overlap data between a first tile 414 and a second tile 416. In a second pass, the first layer 406 executes a second instruction that retrieves the first portion 412 from the secondary buffer 404 for the second tile 416. In the second pass, the first layer 406 can also execute another instruction that identifies a second portion 418 of the second tile 416 to be stored in the secondary buffer 404. The second portion 418 represents overlap data between the second tile 416 and a third tile 420. In a third pass, the first layer 406 executes a third instruction that retrieves the second portion 418 from the secondary buffer 404 for the third tile 420. In at least one embodiment, the first layer 406 can execute other instructions that retrieve feature data from the primary buffer (not illustrated in FIG. 4). In at least one embodiment, a single instruction can be used to retrieve feature data from the primary buffer and overlap data from the secondary buffer 404. In at least one embodiment, separate instructions can be used to retrieve feature data from the primary buffer and overlap data from the secondary buffer 404.

In at least one embodiment, in the first pass, the second layer 408 executes a first instruction that identifies a first portion 422 of a first tile 424 to be stored in the secondary buffer 404. The first portion 422 represents overlap data between the first tile 424 and a second tile 426. In the second pass, the second layer 408 executes a second instruction that retrieves the first portion 422 from the secondary buffer 404 for the second tile 426. In the second pass, the second layer 408 can also execute another instruction that identifies a second portion 428 of the second tile 426 to be stored in the secondary buffer 404. The second portion 428 represents overlap data between the second tile 426 and a third tile 430.

In a third pass, the second layer 408 executes a third instruction that retrieves the second portion 418 from the secondary buffer 404 for the third tile 430. In at least one embodiment, the second layer 408 can execute other instructions that retrieve feature data from the primary buffer (not illustrated in FIG. 4). In at least one embodiment, a single instruction can be used to retrieve feature data from the primary buffer and overlap data from the secondary buffer 404. In at least one embodiment, separate instructions can be used to retrieve feature data from the primary buffer and overlap data from the secondary buffer 404.

In at least one embodiment, the third layer 410 can execute other instructions that retrieve feature data from the primary buffer (not illustrated in FIG. 4) without retrieving overlap data from the secondary buffer 404. Similarly, the input layer 402 can execute one or more instructions that retrieve input data or feature data from an external memory device or the primary buffer (not illustrated in FIG. 4). The input layer 402 can execute one or more instructions that store output data or output feature data to the primary buffer.

Figure 5:
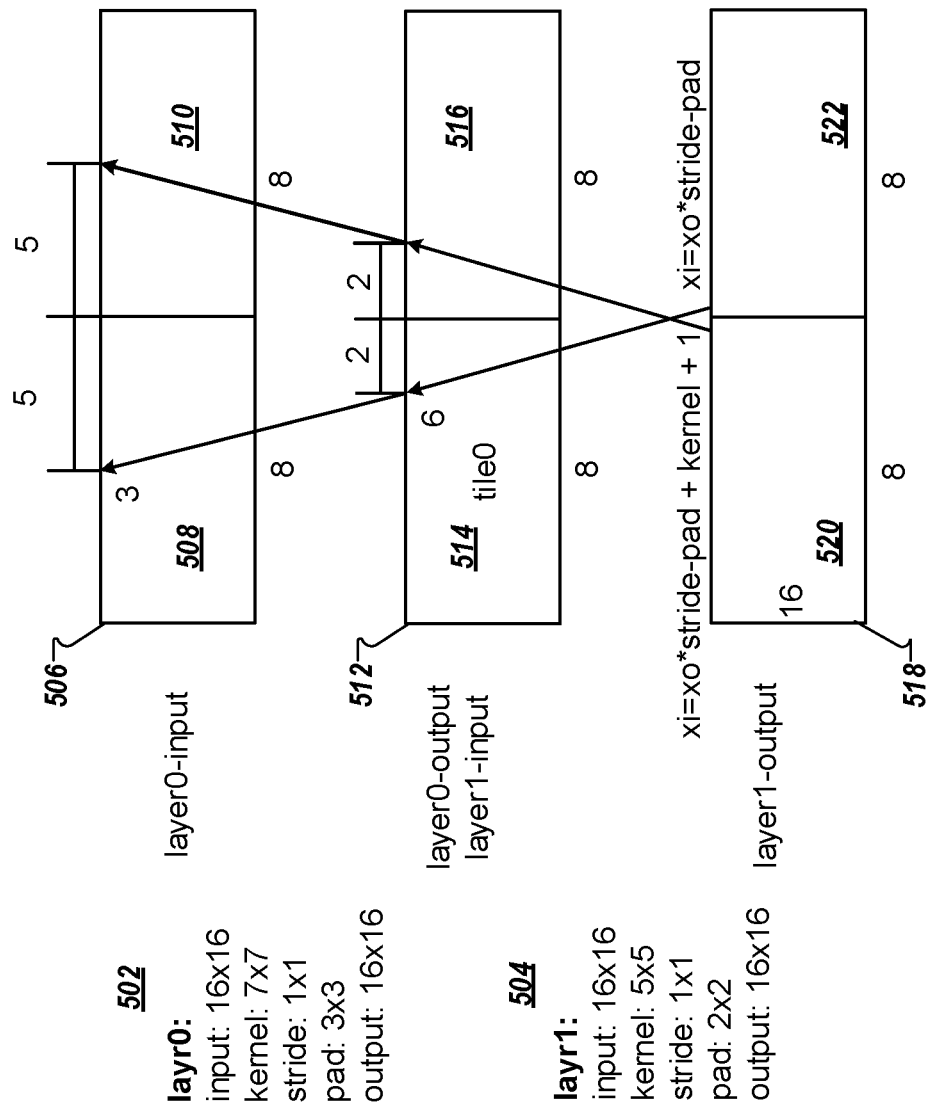
FIG. 5 is a diagram illustrating two convolution layers using hardware instructions to store and fetch overlap data in tiles between passes, in accordance with at least some embodiments.

As described herein, a compiler can include various parameters that allow the compiler to generate a set of hardware instructions that identify overlap data and store the overlap data in a secondary buffer, such as illustrated in FIG. 5.

FIG. 5 is a diagram illustrating two convolution layers using hardware instructions to store and fetch overlap data in tiles between passes, in accordance with at least some embodiments. A first convolution layer 502 has the following parameters: input size: 16×16, kernel size: 7×7, stride: 1×1, pad: 3×3, and output size: 16×16. A second convolution layer 504 has the following parameters: input size: 16×16, kernel size: 5×5, stride: 1×1, pad: 2×2, and output size: 16×16. As illustrated in FIG. 5, the first layer 502 receives a first input 506, the first input being 16×16. The first input may exceed a capacity specified for the primary buffer, so the first input 506 is split into two tiles, a first tile 508 and a second tile 510. The first layer 502 outputs a first output 512, the first output being 16×16. Because the first input 506 is split into two tiles, the first output 512 is also split into two tiles, a first tile 514 and a second tile 516. Because the first layer 502 and the second layer 504 are chained, the first output 512 of the first layer 502 is also a second input of the second layer 504. The second layer 504 outputs a second output 518, the second output being 16×16. Because the first output 512 is split into two tiles, the second output 518 is also split into two tiles, a first tile 520 and a second tile 522.

In at least one embodiment, a compiler can generate a set of instructions to perform two convolutions with two tiles in two passes using a primary buffer (CBUF). An example set of instructions are set forth below:

conv0 (in: DRAM, 13×16, out: CBUF, 10×16, pass0)
conv1 (in: CBUF, 10×16, out: CBUF, 8×16, pass0)
conv0 (in: DRAM, 13×16, out: CBUF, 10×16, pass1)
conv1 (in: CBUF, 10×16, out: DRAM, 8×16, pass1)

In at least one embodiment, when using a secondary buffer to store overlap data, the compiler can generate a set of instructions to perform two convolutions with two tiles in two passes using a primary buffer (CBUF) and a secondary buffer (UBUF). The compiler can generate additional instructions than those above to store and fetch the appropriate feature data from the primary buffer and overlap data from the secondary buffer. An example set of instructions are set forth below:

conv0 (in: DRAM, 13×16, out: CBUF, 10×16, pass0)
crop (in: CBUF, 4×16, stride: xxx, out: UBUF, 4×16, pass0)
conv1 (in: CBUF, 10×16, out: CBUF, 8×16, pass0)
conv0 (in: DRAM, 9×16, out: CBUF, 6×16, pass1)
fetch+conv1 (in: CBUF(6×16)+UBUF(4×16), out: DRAM, 8×16, pass1)

In at least one embodiment, by storing the overlap data in the secondary buffer, there can be memory traffic savings of 30% (e.g., (13−9)/13=30% traffic savings) and computational savings of 40% (e.g., (10−6)/10=40% MAC savings). This set of instructions can be used when there is no hardware crop support in the accelerator circuit. In at least one embodiment, the compiler can use instructions with hardware crop to store the appropriate feature data from the primary buffer and overlap data from the secondary buffer. An example set of instructions are set forth below:

conv0+crop (in: DRAM, 13×16, out: CBUF, 10×16, UBUF, 4×16, pass0)
conv1 (in: CBUF, 10×16, out: CBUF, 8×16, pass0)
conv0 (in: DRAM, 9×16, out: CBUF, 6×16, pass1)
fetch+conv1 (in: CBUF(6×16)+UBUF(4×16), out: DRAM, 8×16, pass1)

Alternatively, the compiler can generate other instruction sets to identify, store, and retrieve overlap data between tiles across passes.

Figure 6:
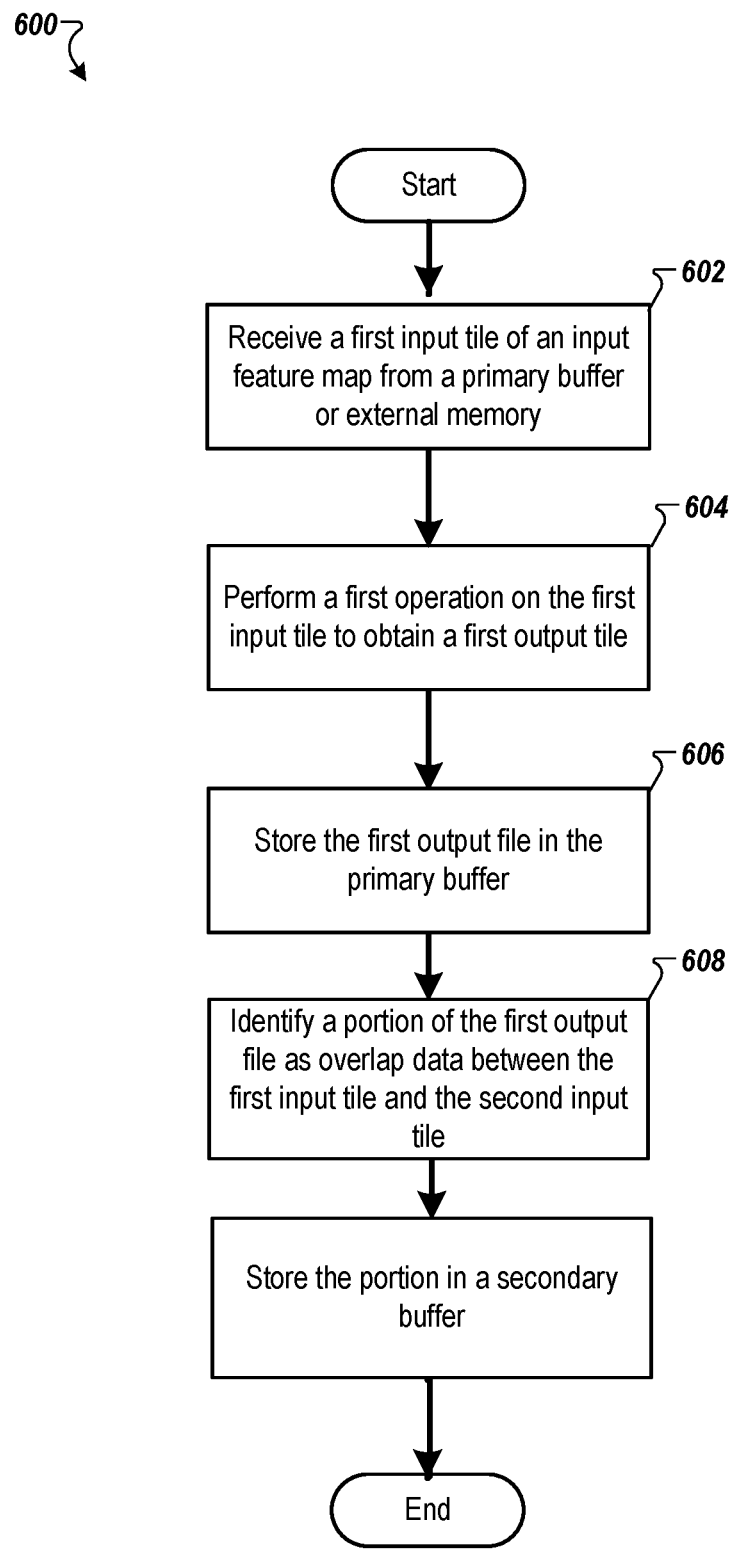
FIG. 6 is a flow diagram of a method of identifying and storing a portion of an output tile in a secondary buffer, in accordance with at least some embodiments.

FIG. 6 is a flow diagram of a method 600 of identifying and storing a portion of an output tile in a secondary buffer, in accordance with at least some embodiments. Method 600 can be performed by processing logic comprising hardware, software, firmware, or any combination thereof. In at least one embodiment, the method 600 is performed by the hardware of accelerator core 100 of FIG. 1. In at least one embodiment, the method 600 is performed by convolution engine 104 of FIG. 1. In at least one embodiment, the method 600 is performed by the pooling engine 108 of FIG. 1.

Referring back to FIG. 6, the method 600 begins with the processing logic receiving a first input tile of an input feature map from a primary buffer of the accelerator circuit or external memory coupled to the accelerator circuit (block 602). The input feature map's size exceeds a storage capacity of the primary buffer, and the input feature map includes at least the first input tile and a second input tile. The processing logic performs a first operation on the first input tile to obtain a first output tile (block 604). The processing logic stores the first output tile in the primary buffer (block 606). The processing logic identifies a portion of the first output tile as corresponding to overlap data between the first input tile and the second input tile (block 608). The processing logic stores the portion of the first output tile in a secondary buffer of the accelerator circuit (block 610), and the method 600 ends.

In at least one embodiment, the processing logic identifies the portion and stores the portion of the first output tile in the secondary buffer in a first pass. In a second pass that is subsequent to the first pass, the processing logic receives a portion of the second input tile from the primary buffer and performs the first operation on the portion of the second input tile to obtain a portion of a second output tile. The processing logic retrieves the portion of the first output tile from the secondary buffer. The processing logic stores the second output tile in the primary buffer. The second output tile includes the portion of the second output tile and the portion of the first output tile.

In at least one embodiment, the processing logic, in a second pass, identifies a portion of the second output tile as corresponding to overlap data between the first input tile and a third input tile. In this embodiment, the input feature map includes the first input tile, the second input tile, and a third input tile. The processing logic stores the portion of the second output tile in the secondary buffer. In a third pass, the processing logic receives a portion of the third input tile from the primary buffer and performs the first operation on the portion of the third input tile to obtain a portion of a third output tile. The processing logic retrieves the portion of the second output tile from the secondary buffer and stores portion of the second output tile as part of the third output tile in the primary buffer. The third output tile includes the portion of the third output tile based on the first operation and the portion of the second output tile retrieved from the secondary buffer.

In at least one embodiment, in a first pass, the processing logic retrieves the first output tile from the primary buffer and performs a second operation on the first output tile to obtain a third output tile and stores the third output tile in the primary buffer. In a second pass, the processing logic retrieves the second output tile from the primary buffer and performs the second operation on the second output tile to obtain a fourth output tile. The processing logic stores the fourth output tile in the primary buffer.

In at least one embodiment, the first operation is performed by a first fixed-function engine that processes a first layer type, and the second operation is performed by a second fixed-function engine that processes a second layer type. In at least one embodiment, the first operation and the second operation are performed by the same fixed-function engine.

Figure 7:
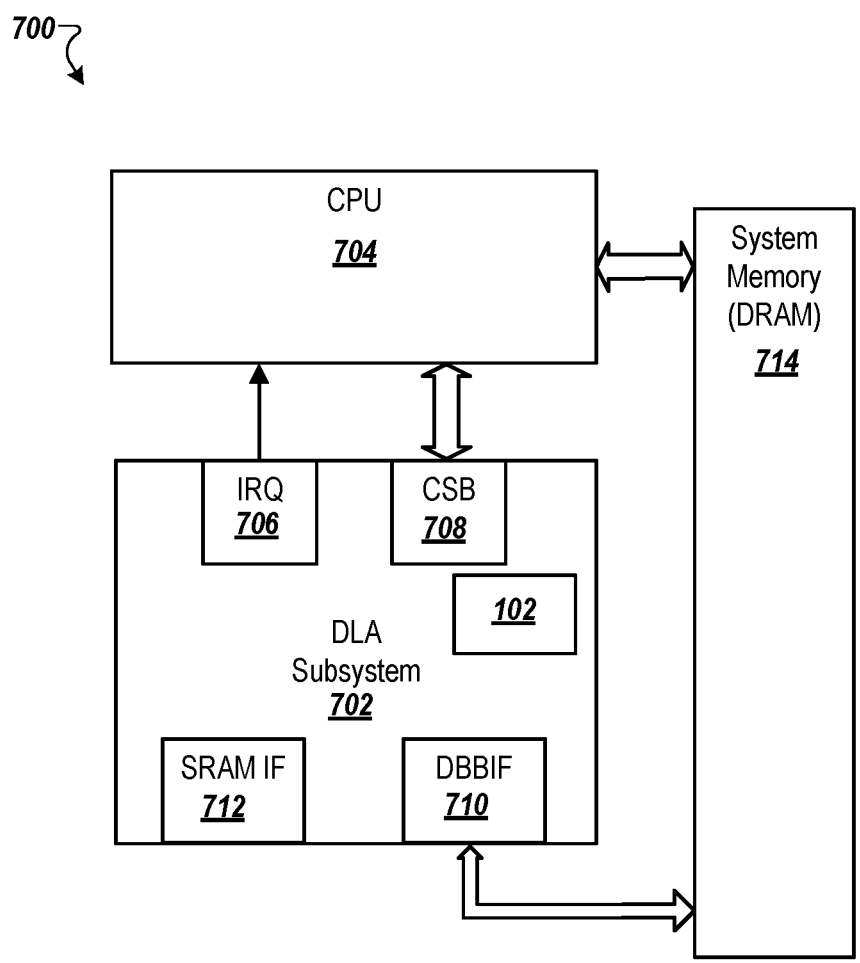
FIG. 7 is a block diagram of a deep learning accelerator (DLA) system, in accordance with at least some embodiments.

FIG. 7 is a block diagram of a DLA system 700, in accordance with at least some embodiments. DLA system 700 is considered a headless system in which unit-by-unit management of a DLA subsystem 702 happens on a main system processor, CPU 704. DLA subsystem 702 includes an interrupt interface 706, a configuration space bus (CSB) interface 708, a primary data bus interface 710 (DBBIF), a secondary data bus interface 712, and the overlap data buffer 102 described above with respect to FIG. 1. The CPU 704 and the DLA subsystem 702 are coupled to system memory 714 (e.g., DRAM). The DLA subsystem 702 is coupled to the system memory 714 via the primary data bus interface 710. The DLA subsystem 702 can be coupled to a secondary memory, such as SRAM (not illustrated in FIG. 7). It should be noted that the DLA system 700 may not include the optional secondary data bus interface 712 as the system memory 714 can consume less power than an SRAM when overall system performance is less of a priority. The DLA system 700 can be more power-efficient to use the system memory 714 as a computation cache.

DLA system 700 of FIG. 7 represents a more cost-sensitive system than a DLA system with a dedicated controller or coprocessor for unit-by-unit management of the DLA subsystem 702. The DLA system 700 can be considered a small system model. The small system model can be used for cost-sensitive connected Internet of Things (IoT) class devices, artificial intelligence (AI), and automation-oriented systems with well-defined tasks for which cost, area, and power are the primary drivers. Savings in terms of cost, area, and power can be achieved through configurable resources of the DLA subsystem 702. Neural network models can be pre-compiled and their performance can be optimized, allowing larger models to be reduced in the load complexity. In turn, the reduction in load complexity enables a scaled-down DLA implementation where models consume less storage and take less time for system software to load and process. In at least one embodiment, the DLA system 700 can execute one task at a time. Alternatively, the DLA system 700 can execute multiple tasks at a time. For DLA system 700, context switches by DLA system 700 do not result in the CPU 704 being overly burdened by servicing a large number of interrupts from the DLA subsystem 702. This removes the need for an additional microcontroller, and the CPU 704 performs memory allocation and other DLA subsystem management operations. As described herein, the DLA subsystem 702 includes an overlap data buffer 102 for tiling between chained layers performed by fixed-function engines and other operations by the CPU 704.

Figure 8:
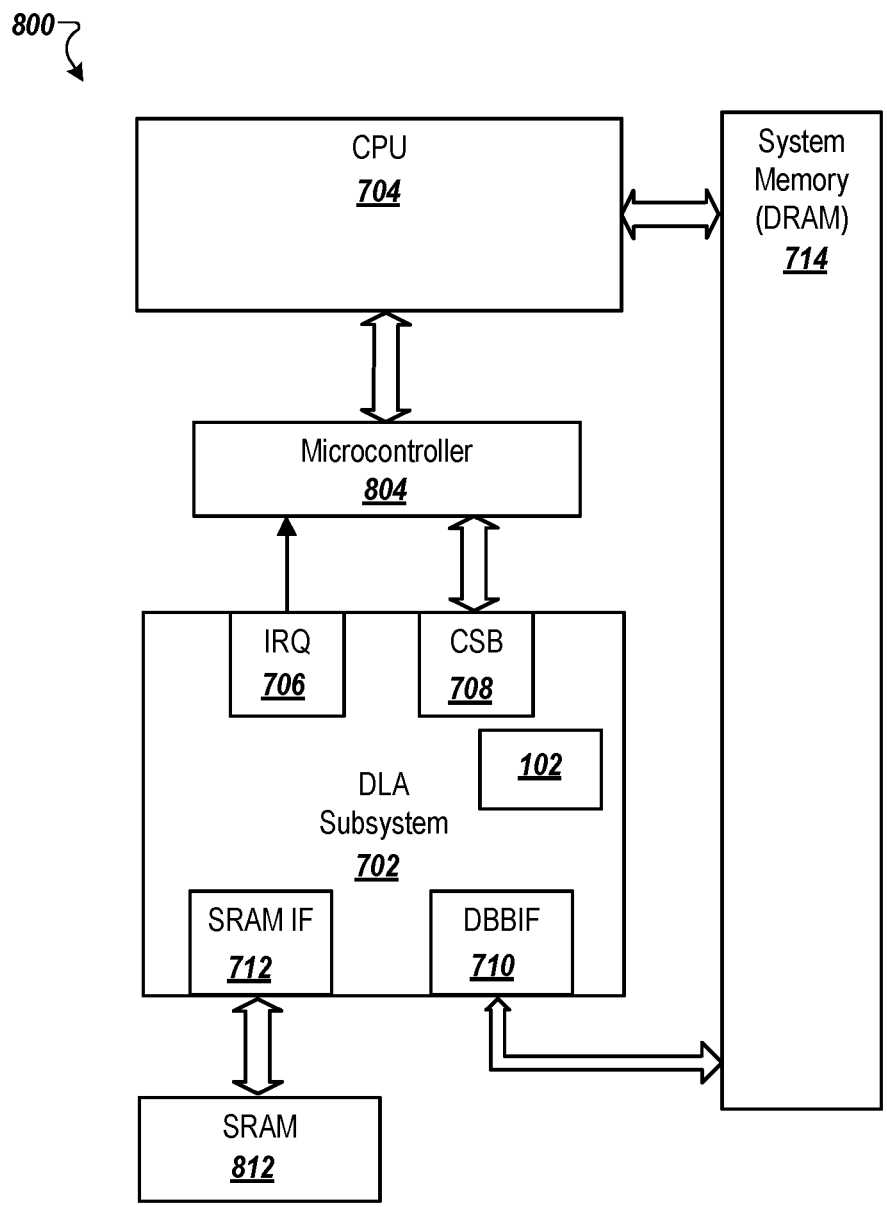
FIG. 8 is a block diagram of a DLA system, in accordance with at least some embodiments.

FIG. 8 is a block diagram of a DLA system 800, in accordance with at least some embodiments. DLA system 800 is considered a headed system in which a main system processor, CPU 802 delegates high-interrupt-frequency tasks to a companion microcontroller 804 coupled to a DLA subsystem 702. DLA system 800 is similar to DLA system 700 as noted by similar reference numbers, except the DLA system 800 includes the companion microcontroller 804. DLA system 800 can be considered a larger system that is characterized by the addition of a dedicated control coprocessor and high-bandwidth SRAM to support the DLA subsystem 702. The larger system model can be used in IoT devices that may run many tasks at once.

In some cases, the larger DLA model in FIG. 8 is used when higher performance and versatility are needed. Performance-oriented IoT systems may perform inference on many different network topologies; thus, they maintain a high degree of flexibility. Additionally, these systems may be performing many tasks at once, rather than serializing inference operations, so inference operations would not consume too much processing power on the CPU 704. To address these needs, the DLA subsystem 702 includes the secondary data bus interface 712 that couples to a dedicated high-bandwidth SRAM 812. The SRAM 812 can be used as a cache by the DLA subsystem 702. The SRAM 812 can also be used by other high-performance computer-vision-related components on the system to further reduce traffic to the main system memory 714 (e.g., DRAM). The DLA subsystem 702 enables the interface with the microcontroller 804 (or a dedicated control coprocessor) to limit the interrupt load on the CPU 704. In at least one embodiment, the microcontroller 804 can be a RISC-V-based PicoRV32 processor, an ARM Cortex-M or Cortex-R processors, or other microcontroller designs. Using a dedicated coprocessor (microcontroller 804), the host processor (CPU 704) can handle some tasks associated with managing the DLA subsystem 702. For example, the microcontroller 804 or CPU 704 can still handle fine-grained or coarse-grained scheduling of the DLA hardware, input-output memory management (IOMMU) mappings of DLA memory access, as needed, memory allocation of input data and fixed weight arrays on DLA subsystem 702, and synchronization between other system components and tasks that run on the DLA subsystem 702.

In at least one embodiment, DLA subsystem 702 is programmable into multiple modes of operation, such as an independent mode, a fused mode, or the like. Each functional block can be configured in an independent mode for when and what it executes, with each block working on its assigned task (akin to independent layers in a Deep Learning framework). Independent operations can begin and end with the assigned block performing memory-to-memory operations, in and out of main system memory or dedicated SRAM memory. In a fused mode, some blocks can be assembled as a pipeline. Pipelines can improve performance by bypassing the round trip through memory instead of having blocks communicate with each other through small first-in-first-out (FIFO) queues. For example, the convolution engine can pass data to the Single Data Point Processor, which can pass data to the Planar Data Processor and the Cross-channel Data Processor).

The techniques disclosed herein may be incorporated in any processor that may be used for processing a neural network, such as, for example, a central processing unit (CPU), a GPU, an intelligence processing unit (IPU), neural processing unit (NPU), tensor processing unit (TPU), a neural network processor (NNP), a data processing unit (DPU), a vision processing unit (VPU), an application-specific integrated circuit (ASIC), a field-programmable gate array (FPGA), and the like. Such a processor may be incorporated in a personal computer (e.g., a laptop), at a data center, in an Internet of Things (IoT) device, a handheld device (e.g., smartphone), a vehicle, a robot, a voice-controlled device, or any other device that performs inference, training or any other processing of a neural network. Such a processor may be employed in a virtualized system such that an operating system executing in a virtual machine on the system can utilize the processor.

As an example, a processor incorporating the techniques disclosed herein can be employed to process one or more neural networks in a machine to identify, classify, manipulate, handle, operate, modify, or navigate around physical objects in the real world. For example, such a processor may be employed in an autonomous vehicle (e.g., an automobile, motorcycle, helicopter, drone, plane, boat, submarine, delivery robot, etc.) to move the vehicle through the real world. Additionally, such a processor may be employed in a robot at a factory to select components and assemble components into an assembly.

As an example, a processor incorporating the techniques disclosed herein can be employed to process one or more neural networks to identify one or more features in an image or to alter, generate, or compress an image. For example, such a processor may be employed to enhance an image that is rendered using raster, ray-tracing (e.g., using NVIDIA RTX), and/or other rendering techniques. In another example, such a processor may be employed to reduce the amount of image data that is transmitted over a network (e.g., the Internet, a mobile telecommunications network, a Wi-Fi® network, as well as any other wired or wireless networking system) from a rendering device to a display device. Such transmissions may be utilized to stream image data from a server or a data center in the cloud to a user device (e.g., a personal computer, video game console, smartphone, other mobile devices, etc.) to enhance services that stream images, such as NVIDIA Geforce Now® (GFN), Google Stadia, and the like.

As an example, a processor incorporating the techniques disclosed herein can be employed to process one or more neural networks for any other types of applications that can take advantage of a neural network. For example, such applications may involve translating languages, identifying and negating sounds in audio, detecting anomalies or defects during the production of goods and services, surveillance of living beings and non-living things, medical diagnosis, making decisions, and the like.

Other variations are within the spirit of the present disclosure. Thus, while disclosed techniques are susceptible to various modifications and alternative constructions, certain illustrated embodiments are shown in drawings and described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if something is intervening. Recitation of ranges of values herein is merely intended to serve as a shorthand method of referring individually to each separate value falling within the range unless otherwise indicated herein. Each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when indicated explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more individual non-transitory storage media of multiple non-transitory computer-readable storage media lacks all of the code while multiple non-transitory computer-readable storage media collectively store all of the code. In at least one embodiment, executable instructions are executed such that different instructions are executed by different processors— for example, a non-transitory computer-readable storage medium store instructions and a main central processing unit ("CPU") executes some of the instructions while a graphics processing unit ("GPU") and/or a data processing unit ("DPU")— potentially in conjunction with a GPU)—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or a similar electronic computing device, that manipulates and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as a system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application-programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or an interprocess communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. An accelerator circuit comprising:
   a primary buffer;
   a secondary buffer;
   a memory interface to couple to an external memory device; and
   one or more processing units coupled to the primary buffer, the secondary buffer, and the memory interface, wherein the one or more processing units are to execute, in a plurality of passes corresponding to a number of tiles, instructions corresponding to a plurality of chained layers of a neural network, wherein, in each pass of the plurality of passes, each layer of the plurality of chained layers is executed in a chained fashion with the other layers of the plurality of chained layers and communicates with the other layers via the primary buffer, wherein the instructions, when executed by the one or more processing units in a first pass of the plurality of passes, cause the one or more processing units to:
receive a first input tile of an input feature map from the primary buffer, wherein a size of the input feature map exceeds a storage capacity of the primary buffer, and wherein the input feature map comprises at least the first input tile and a second input tile;
perform a first operation on the first input tile to obtain a first output tile;
store the first output tile in the primary buffer;
identify a portion of the first output tile as corresponding to overlap data between the first input tile and the second input tile; and
store the portion of the first output tile in the secondary buffer, wherein the secondary buffer has a storage capacity less than a size of the first output tile and is reserved exclusively for the overlap data in a second pass that is subsequent to the first pass.

2. The accelerator circuit of claim 1, wherein the instructions, when executed by the one or more processing units in the second pass that is subsequent to the first pass, cause the one or more processing units further to:
receive a portion of the second input tile from the primary buffer;
perform the first operation on the portion of the second input tile to obtain a portion of a second output tile;
retrieve the portion of the first output tile from the secondary buffer; and
store the portion of the first output tile as part of the second output tile in the primary buffer.

3. The accelerator circuit of claim 2, wherein the instructions, when executed by the one or more processing units, cause the one or more processing units further to:
in the first pass,
retrieve the first output tile from the primary buffer,
perform a second operation on the first output tile to obtain a third output tile, and
store the third output tile in the primary buffer; and
in the second pass,
retrieve the second output tile from the primary buffer;
perform the second operation on the second output tile to obtain a fourth output tile; and
store the fourth output tile in the primary buffer.

4. The accelerator circuit of claim 3, wherein the one or more processing units comprise:
a first fixed-function engine to process a first layer type of the plurality of chained layers, wherein the first fixed-function engine is to receive the first input tile, perform the first operation on the first input tile, store the first output tile, receive the portion of the second input tile, perform the first operation on the portion of the second input tile, retrieve the portion of the first output tile, and store the second output tile; and
a second fixed-function engine to process a second layer type of the plurality of chained layers, wherein the second fixed-function engine is to retrieve the first output tile, perform the second operation on the first output tile, store the third output tile, retrieve the second output tile, perform the second operation on the second output tile, and store the fourth output tile.

5. The accelerator circuit of claim 3, wherein the one or more processing units comprise:
a first fixed-function engine to process a first layer type of the plurality of chained layers, wherein the first fixed-function engine is to receive the first input tile, perform the first operation on the first input tile, store the first output tile, receive the portion of the second input tile, perform the first operation on the portion of the second input tile, retrieve the portion of the first output tile, store the second output tile, retrieve the first output tile, perform the second operation on the first output tile, store the third output tile, retrieve the second output tile, perform the second operation on the second output tile, and store the fourth output tile.

6. The accelerator circuit of claim 2, wherein the instructions, when executed by the one or more processing units in the second pass, cause the one or more processing units further to:
identify a portion of the second output tile as corresponding to overlap data between the first input tile and a third input tile; and
store the portion of the second output tile in the secondary buffer.

7. The accelerator circuit of claim 6, wherein the input feature map comprises the first input tile, the second input tile, and a third input tile, wherein the instructions, when executed by the one or more processing units in a third pass that is subsequent to the second pass, cause the one or more processing units further to:
receive a portion of the third input tile from the primary buffer;
perform the first operation on the portion of the third input tile to obtain a portion of a third output tile;
retrieve the portion of the second output tile from the secondary buffer; and
store the portion of the second output tile as part of the third output tile in the primary buffer.

8. The accelerator circuit of claim 1, further comprising an internal memory device comprising the primary buffer and the secondary buffer, wherein the primary buffer is a first region of the internal memory device reserved as a first-level (L1) memory, wherein the secondary buffer is a second region of the internal memory device reserved as a second-level (L2) memory, and wherein the external memory device is reserved as a third-level (L3) memory.

9. The accelerator circuit of claim 1, wherein the one or more processing units comprise at least one of a convolution engine or a pooling engine.

10. A deep learning accelerator (DLA) core comprising:
a register file to store configuration information associated with at least a portion of a neural network comprising a plurality of layers, wherein each layer of the plurality of layers is executed in a chained fashion with the other layers of the plurality of layers in a plurality of passes corresponding to a number of tiles;
a memory interface to couple to an external memory device;
a convolution buffer, wherein the convolution buffer comprises a reserved region;
a convolution engine coupled to the convolution buffer and the memory interface, wherein the convolution engine, in a first pass of the plurality of passes, is to:
receive a first input tile of an input feature map from the convolution buffer, wherein a size of the input feature map exceeds a storage capacity of the convolution buffer, wherein the input feature map comprises at least the first input tile and a second input tile;
execute a first hardware layer on the first input tile to obtain a first output tile;
store the first output tile in the convolution buffer;
identify a portion of the first output tile as corresponding to overlap data between the first input tile and the second input tile; and
store the portion of the first output tile in the reserved region, wherein the reserved region has a storage capacity less than a size of the first output tile and is reserved exclusively for the overlap data in a second pass that is subsequent to the first pass.

11. The DLA core of claim 10, wherein the convolution engine, in the second pass that is subsequent to the first pass, is further to:
receive a portion of the second input tile from the convolution buffer;
execute the first hardware layer on the portion of the second input tile to obtain a portion of a second output tile;
retrieve the portion of the first output tile from the reserved region; and
store the portion of the first output tile as part of the second output tile in the convolution buffer.

12. The DLA core of claim 11, wherein the convolution engine, in the first pass, is further to:
retrieve the first output tile from the convolution buffer;
execute a second hardware layer on the first output tile to obtain a third output tile; and
store the third output tile in the convolution buffer, and wherein the convolution engine, in the second pass, is further to:
retrieve the second output tile from the convolution buffer;
execute the second hardware layer on the second output tile to obtain a fourth output tile; and
store the fourth output tile in the convolution buffer.

13. The DLA core of claim 11, wherein the convolution engine, in the second pass, is further to:
identify a portion of the second output tile as corresponding to overlap data between the first input tile and a third input tile; and
store the portion of the second output tile in the reserved region.

14. The DLA core of claim 13, wherein the input feature map comprises the first input tile, the second input tile, and a third input tile, wherein the convolution engine, in a third pass that is subsequent to the second pass, is further to:
receive a portion of the third input tile from the convolution buffer;
execute the first hardware layer on the portion of the third input tile to obtain a portion of a third output tile;
retrieve the portion of the second output tile from the reserved region; and
store the portion of the second output tile as part of the third output tile in the convolution buffer.

15. A method comprising:
receiving, by a processing unit of an accelerator circuit, a first input tile of an input feature map from a primary buffer of the accelerator circuit, wherein a size of the input feature map exceeds a storage capacity of the primary buffer, and wherein the input feature map comprises at least the first input tile and a second input tile;
performing, by the processing unit, a first operation on the first input tile to obtain a first output tile;
storing the first output tile in the primary buffer;
identifying a portion of the first output tile as corresponding to overlap data between the first input tile and the second input tile; and
storing the portion of the first output tile in a secondary buffer of the accelerator circuit, wherein identifying the portion of the first output tile and storing the portion of the first output tile in the secondary buffer are performed in a first pass of a plurality of passes corresponding to a number of tiles, and wherein, in each pass of the plurality of passes, each layer of a plurality of chained layers is executed in a chained fashion with the other layers of the plurality of chained layers and communicates with the other layers via the primary buffer, and wherein the secondary buffer has a storage capacity less than a size of the first output tile and is reserved exclusively for the overlap data in a second pass that is subsequent to the first pass.

16. The method of claim 15, wherein, in the second pass that is subsequent to the first pass, the method further comprises:
receiving a portion of the second input tile from the primary buffer;
performing the first operation on the portion of the second input tile to obtain a portion of a second output tile;
retrieving the portion of the first output tile from the secondary buffer; and
storing the portion of the first output tile as part of the second output tile in the primary buffer.

17. The method of claim 16, further comprising, in the second pass:
identifying a portion of the second output tile as corresponding to overlap data between the first input tile and a third input tile, wherein the input feature map comprises the first input tile, the second input tile, and a third input tile;
storing the portion of the second output tile in the secondary buffer;
receiving a portion of the third input tile from the primary buffer;
performing the first operation on the portion of the third input tile to obtain a portion of a third output tile;
retrieving the portion of the second output tile from the secondary buffer; and
storing the portion of the second output tile as part of the third output tile in the primary buffer.

18. The method of claim 16, further comprising:
in the first pass,
retrieving the first output tile from the primary buffer,
performing a second operation on the first output tile to obtain a third output tile, and
storing the third output tile in the primary buffer; and
in the second pass,
retrieving the second output tile from the primary buffer;
performing the second operation on the second output tile to obtain a fourth output tile; and
storing the fourth output tile in the primary buffer.

19. The method of claim 18, wherein performing the first operation comprises performing the first operation using a fixed-function engine, and wherein performing the second operation comprises performing the second operation using the fixed-function engine.

20. The method of claim 18, wherein performing the first operation comprises performing the first operation using a first fixed-function engine that processes a first layer type of a plurality of layers, and wherein performing the second operation comprises performing the second operation using a second fixed-function engine that processes a second layer type of the plurality of layers.

* * * * *